United States Patent
Maher et al.

(10) Patent No.: US 10,767,704 B2
(45) Date of Patent: Sep. 8, 2020

(54) BEARING REPAIR UNDER HIGH LOADING CONDITION

(71) Applicant: Trendsetter Vulcan Offshore, Inc., Houston, TX (US)

(72) Inventors: James V. Maher, Houston, TX (US); David Sverre, Houston, TX (US); Daniel McCelvey, Houston, TX (US); Russell Hegler, Houston, TX (US); Ricky Brown, Houston, TX (US)

(73) Assignee: TRENDSETTER VULCAN OFFSHORE, INC., Houston, TX (US)

( * ) Notice: Subject to any disclaimer, the term of this patent is extended or adjusted under 35 U.S.C. 154(b) by 125 days.

(21) Appl. No.: 15/889,059

(22) Filed: Feb. 5, 2018

(65) Prior Publication Data
US 2019/0242436 A1    Aug. 8, 2019

(51) Int. Cl.
| F16C 43/04 | (2006.01) |
| F16C 19/30 | (2006.01) |
| B23P 15/00 | (2006.01) |
| B23P 6/00 | (2006.01) |

(52) U.S. Cl.
CPC .............. *F16C 43/04* (2013.01); *B23P 6/00* (2013.01); *B23P 15/003* (2013.01); *F16C 19/30* (2013.01); *F16C 2237/00* (2013.01); *F16C 2300/14* (2013.01); *Y10T 29/49638* (2015.01); *Y10T 29/49732* (2015.01)

(58) Field of Classification Search
CPC .............. F16C 2237/00; F16C 2226/60; F16C 2300/14; Y10T 29/49638; Y10T 29/49732
See application file for complete search history.

(56) References Cited

U.S. PATENT DOCUMENTS

| 5,860,382 A | * | 1/1999 | Hobdy ................ B63B 21/507 |
| | | | 114/230.15 |
| 5,893,784 A | | 4/1999 | Boatman |
| 8,197,293 B2 | | 6/2012 | Gooijer et al. |
| | | | (Continued) |

FOREIGN PATENT DOCUMENTS

| KR | 101370663 B1 | 3/2014 |
| WO | 2011036406 A1 | 3/2011 |
| | (Continued) | |

OTHER PUBLICATIONS

Machine translation of WO 2011/036406 (A1) in English, 8 pages.
Machine translation of KR 10-1370663 (B1) in English, 5 pages.

*Primary Examiner* — Jason L Vaughan
(74) *Attorney, Agent, or Firm* — Jonathan Pierce; Pierre Campanac; Porter Hedges LLP (57) ABSTRACT

A repair axial bearing system includes an arcuate rail coupled to a support, one or more bolts protruding upward from a raised portion coupled to a supported member, and a lever plate including at least one low friction bearing pad mounted in the lever plate. A first new bearing surface is formed on the arcuate rail. A second new bearing surface is formed on the at least one low friction bearing pad. The one or more bolts are tensioned with bolt tensioners to press the lever plate against the raised portion. The axial bearing system can include a hydraulic cylinder to slide the second bearing surface over the first bearing surface. The repair axial bearing system can be used to supplant a damaged axial bearing positioned between an FPSO and a turret.

25 Claims, 3 Drawing Sheets

(56) References Cited

U.S. PATENT DOCUMENTS

| | | | |
|---|---|---|---|
| 8,770,128 B2 | 7/2014 | Dupont et al. | |
| 8,950,349 B2 * | 2/2015 | Lindblade | F16C 21/00 |
| | | | 114/230.12 |
| 10,046,834 B1 * | 8/2018 | Lindblade | F16C 19/381 |
| 10,183,727 B1 | 1/2019 | Lindblade et al. | |
| 2014/0050428 A1 * | 2/2014 | Lindblade | F16C 21/00 |
| | | | 384/127 |
| 2019/0144077 A1 * | 5/2019 | Lindblade | B63B 21/507 |
| | | | 114/230.12 |

FOREIGN PATENT DOCUMENTS

| | | | | |
|---|---|---|---|---|
| WO | 2017179986 A1 | 10/2017 | | |
| WO | WO-2017179886 A1 * | 10/2017 | | A23B 7/10 |

* cited by examiner

BEARING REPAIR UNDER HIGH LOADING CONDITION

CROSS-REFERENCE TO RELATED APPLICATIONS

None

BACKGROUND

This disclosure relates to repair bearing systems for supplanting a damaged axial bearing, methods for supplanting a damaged axial bearing with a repair axial bearing, and methods for using a repair axial bearing system. The repair axial bearing provides a new load path at another location than through the damaged axial bearing, as well as new bearing surfaces. The repair bearing systems disclosed herein may be used in situations where it may be impractical to remove and replace the damaged axial bearing. In a non-limiting example, the damaged axial bearing and/or the repair axial bearing may be used to provide rotation between a Floating Production Storage and Offloading (FPSO) unit/facility and a turret moored over a subsea wellhead.

In some situations, large axial bearings (e.g., having a diameter on the order of five meters or more) are used to provide rotation and support to heavy parts (e.g., having a load on the order of one thousand tons or more), and are used in locations that are difficult to access. A particular example of such situation is a bearing used on an FPSO to allow the FPSO to rotate around a geo-stationary turret that connects to the moorings, subsea risers, and associated connections during offshore oil and gas production. Another example may be a bearing used on top of a tower to support a revolving restaurant. When these bearings are damaged, it can be difficult and dangerous to repair them due to the large loads that need to be supported throughout the remediation and installation processes.

Thus, there is a continuing need in the art for systems and method for repairing damaged bearings under high loading conditions.

BRIEF SUMMARY OF THE DISCLOSURE

In some aspects, the disclosure describes a repair axial bearing system. The repair axial bearing system may be used for supplanting a damaged axial bearing placed under axial load between a support and a supported member. For example, the damaged axial bearing may include a lower ring coupled to the support, the lower ring having one of the bearing surfaces of the damaged axial bearing. The damaged axial bearing may include an upper ring coupled to the supported member, the upper ring having the other of the bearing surfaces of the damaged axial bearing. The damaged axial bearing may further include rollers.

The repair axial bearing system may comprise a raised portion. The raised portion may be coupled to the supported member. In some embodiments, the upper ring of the damaged axial bearing may form the raised portion.

The repair axial bearing system may comprise one or more bolts. The one or more bolts may be protruding upward from the raised portion. The one or more bolts may be located adjacent to the bearing surfaces of the damaged axial bearing. The one or more bolts may all be located on one of the inner and outer sides of the bearing surfaces of the damaged axial bearing.

The repair axial bearing system may comprise a fulcrum. The fulcrum may be coupled to the supported member. The fulcrum may be located on the same side of the bearing surfaces of the damaged axial bearing as the one or more bolts.

The repair axial bearing system may comprise a lever plate. The lever plate may be formed of a plurality of plate sections. The lever plate may span over an angular sector of less than sixty degrees. The lever plate may include one or more holes. Each of the one or more holes may correspond to the one or more bolts such that the one or more bolts may extend through the one or more holes. Nuts may be coupled to each of the one or more bolts on the lever plate. The nuts may be used for pressing the lever plate against the raised portion. The fulcrum may be shaped for continuously contacting the lever plate along a pivot line as the lever plate is pressed against the raised portion. Spherical washers may be provided between the one or more bolt and the lever plate.

The lever plate may include at least one low friction bearing pad mounted therein. A first new bearing surface may be formed on the at least one low friction bearing pad. The first new bearing surface may be configured to slide over a second new bearing surface of the repair axial bearing system after the lever plate is pressed against the raised portion.

The repair axial bearing system may comprise an arcuate rail. The arcuate rail may be configured to be coupled to the support. The arcuate rail may be formed of a plurality of contiguous rail sections. The second, new bearing surface may be formed on the arcuate rail. The arcuate rail may be located adjacent to the bearing surfaces of the damaged axial bearing. The arcuate rail may also be located on the opposite side of the bearing surfaces of the damaged axial bearing from the one or more bolts. A height of the arcuate rail may be sized such that the bearing surfaces of the damaged axial bearing are axially unloaded as the lever plate is pressed against the raised portion. The height of the arcuate rail may also be sized such that the first new bearing surface formed on the at least one low friction bearing pad and the second new bearing surface formed on the arcuate rail are axially loaded as the lever plate is pressed against the raised portion. The height of the arcuate rail may further be sized such that the first and second bearing surfaces of the damaged axial bearing are separated from all of the rollers of the damaged axial bearing as the lever plate is pressed against the raised portion of the supported member.

The repair axial bearing system may comprise a hydraulic cylinder. The hydraulic cylinder may have a first end coupled to the support, such as connected to the arcuate rail. The hydraulic cylinder may have a second end coupled to the supported member, such as connected to the lever plate. The second end may be movable relative to the first end.

The repair axial bearing system may comprise a controller programmed to actuate the hydraulic cylinder for rotating the supported member relative to the support.

In some aspects, the disclosure describes a method for supplanting a damaged axial bearing placed under axial load between a support and a supported member with a repair axial bearing. The damaged axial bearing may include bearing surfaces and rollers. For example, some of the rollers of the damaged axial bearing may be crushed. The repair axial bearing may include a first bearing surface formed on an arcuate rail. The repair axial bearing may also include a second bearing surface formed on at least one low friction bearing pad.

The method may involve coupling the arcuate rail to the support. The arcuate rail may be coupled to the support at a location adjacent to the bearing surfaces of the damaged axial bearing. The arcuate rail may further be coupled to the support on one of inner and outer sides of the bearing surfaces of the damaged axial bearing.

The method may involve providing one or more bolts. The one or more bolts may protrude upward from a raised portion coupled to the supported member. The one or more bolts may be provided at a location adjacent to the bearing surfaces of the damaged axial bearing. The one or more bolts may be provided on the other of the inner and outer sides of the bearing surfaces of the damaged axial bearing.

The method may involve coupling a fulcrum to the supported member on the same side of the bearing surfaces of the damaged axial bearing as the one or more bolts.

The method may involve providing a lever plate. The lever plate may include the at least one low friction bearing pad mounted therein. The lever plate may include one or more holes corresponding to the one or more bolts. The one or more bolts may be passed through the one or more holes.

The method may involve pressing the lever plate against the raised portion. The lever plate may continuously contact the fulcrum along a pivot line as the lever plate is pressed against the raised portion of the supported member. For example, pressing the lever plate against the raised portion may involve tensioning the one or more bolts with at least one hydraulic jack, or preferably at least one bolt tensioner, such as by coupling a plurality of bolt tensioners to a manifold to equalize tension in a plurality of bolts. Pressing the lever plate against the raised portion may further involve releasing tension in the one or more bolts after lifting the supported member relative to the support and coupling a nut to each of the one or more bolts on the lever plate.

The method may involve axially unloading the bearing surfaces of the damaged axial bearing as the lever plate is pressed against the raised portion of the supported member. For example, the lifting of the supported member relative to the support may be sufficient to prevent friction of the crushed rollers against the bearing surfaces of the damaged axial bearing.

The method may involve axially loading the first bearing surface and the second bearing surface of the repair axial bearing as the lever plate is pressed against the raised portion of the supported member. As such, the second bearing surface of the repair axial bearing may slide over the first bearing surface of the repair axial bearing after the lever plate is being pressed against the raised portion.

In some aspects, the disclosure describes a method for using a repair axial bearing system having a first bearing surface and a second bearing surface to provide rotation between a support and a supported member. For example, the support may be coupled to an FPSO, and the supported member may be coupled to a turret.

The method may involve providing the repair axial bearing system. The axial bearing system may include an arcuate rail coupled to the support. The first bearing surface may be formed on the arcuate rail. The axial bearing system may further include one or more bolts protruding upward from a raised portion coupled to the supported member. The axial bearing system may further include a lever plate. The lever plate may include at least one low friction bearing pad mounted therein. The second bearing surface may be formed on the at least one low friction bearing pad. The lever plate may further include one or more holes corresponding to the one or more bolts. The one or more bolts may extend through the one or more holes. The lever plate may be pressed against the raised portion using one or more nuts coupled to the one or more bolts on the lever plate. Additionally, the axial bearing system may include a hydraulic cylinder.

The method may involve coupling a first end of the hydraulic cylinder to the support. The method may involve coupling a second end of the hydraulic cylinder to the supported member. The method may involve actuating the hydraulic cylinder to slide the second bearing surface over the first bearing surface. The method may involve synchronizing a movement of the second end relative to the first end to a positioning of the FPSO to maintain the turret geostationary.

BRIEF DESCRIPTION OF THE DRAWINGS

For a more detailed description of the embodiments of the disclosure, reference will now be made to the accompanying drawings, wherein.

DETAILED DESCRIPTION OF EMBODIMENTS

It is to be understood that the following description discloses one or more exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be approximate values unless otherwise specifically stated. Accordingly, various embodiments of the disclosure may deviate from the numbers, values, and ranges described herein without departing from the intended scope of the invention.

Certain terms used throughout the following description and claims refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but are equivalent.

Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Repair axial bearings disclosed herein may provide a short load path for bypassing the load path through a damaged axial bearing. Bolts holding an upper bearing ring of the damaged axial bearing may be replaced with longer ones. The length added to the bolts may permit transmitting the load to a lever plate. The lever plate may then transmit the load over a short distance to an arcuate rail that may replace a portion of a lower bearing ring of the damaged axial bearing.

By iteratively replacing only small subsets of bolts and a small portion of the lower bearing at a time, a load that was carried by the damaged axial bearing may still be supported during the repair operation. Progressively, the load path through the damaged axial bearing may be entirely bypassed.

Further, during the repair operation, the upper bearing ring of the damaged axial bearing may be raised relative to the upper bearing ring. Raising such a large load on a moving ship may conveniently be performed using already available equipment, such as bolt tensioners.

Figure 1:
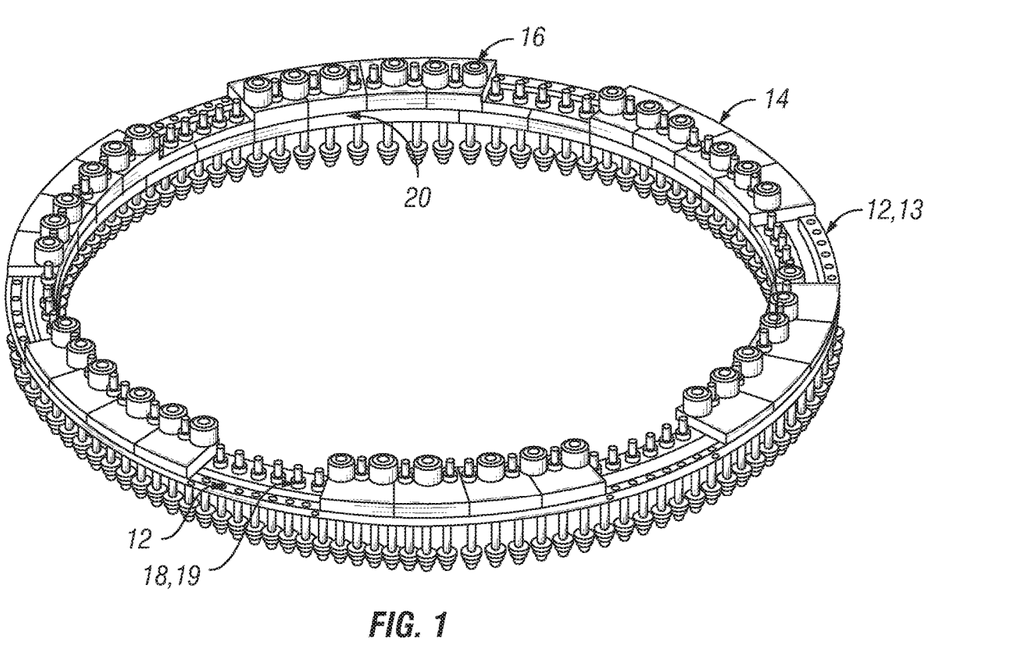
FIG. 1 is a perspective view of a repair axial bearing supplanting a damaged axial bearing.

FIG. 1 illustrates a repair axial bearing that includes an arcuate rail 12, a lever plate 14, and one or more bolts 16 with a nut coupled to each of the one or more bolts 16 on the lever plate 14. As used herein, a bolt generally refers to a rod, a stud, or a heavy pin designed to fasten two or more objects together or to hold one or more objects in place, and having a screw thread cut upon one end. In particular, a bolt is not required to have an enlarged head at the other end. In the example shown in FIG. 1, the arcuate rail 12 is formed of a plurality of contiguous rail sections, and the lever plate 14 is formed of a plurality plate sections that spans over an angular sector of less than sixty degrees. Also, the arcuate rail 12 is shown on the outer side of the bearing surfaces of a damaged axial bearing 18, and the one or more bolts 16 are shown on the inner side of the bearing surfaces of the damaged axial bearing 18.

The lever plate 14 is pressed against a raised portion 19 that is coupled indirectly to a member (not shown) supported by the repair axial bearing. In the example shown in FIG. 1, an upper ring of the damaged axial bearing 18 forms the raised portion 19. The arcuate rail 12 would be coupled to a support (not shown).

A fulcrum 20 is shown on the inner side of the bearing surfaces of the damaged axial bearing 18. The fulcrum 20 is shaped so that the lever plate 14 continuously contacts the fulcrum 20 along a pivot line as the lever plate 14 is pressed against the upper ring of the damaged axial bearing 18. The fulcrum 20 may be used to increase the mechanical advantage achieved by the lever plate 14 for pushing on the arcuate rail 12 under the tension in the one or more bolts 16. Therefore, the fulcrum 20 may be used to facilitate lifting of the supported member relative to the support.

Figure 2:
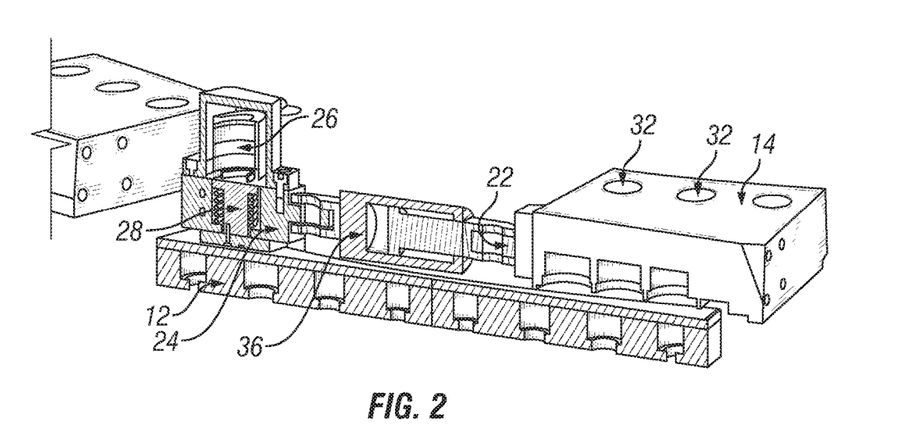
FIG. 2 is a perspective, partially sectional view of a portion of a repair axial bearing system including a hydraulic cylinder.

FIG. 2 illustrates a portion of a repair axial bearing system. In the example shown in FIG. 2, the arcuate rail 12 and the lever plate 14 are shown. The one or more bolts 16 are not shown so that one or more holes 32 corresponding to the one or more bolts 16, are visible.

In the example shown in FIG. 2, the repair axial bearing system comprises a hydraulic cylinder 36 (e.g., a single-acting or double-acting cylinder) having a first end 24 indirectly coupled to the support (not shown) via the arcuate rail 12, and a second end 22 indirectly coupled to the supported member (not shown) via the lever plate 14 and the one or more bolts 16 shown in FIG. 1. The hydraulic cylinder 36 may be actuated by a controller for rotating a first assembly including the lever plate 14 and the supported member relative to a second assembly including the support and the arcuate rail 12. For example, the supported member may rotate in unison with a turret; the support may rotate in unison with an FPSO; and, by synchronizing a movement of the second end 22 relative to the first end 24 to a positioning of the FPSO, the controller may be programmed to maintain the turret geo-stationary as the orientation of the FPSO changes. As such, the controller may be programmed to effect rotation of the turret in either direction or to lock the rotation of the turret.

Figure 3:
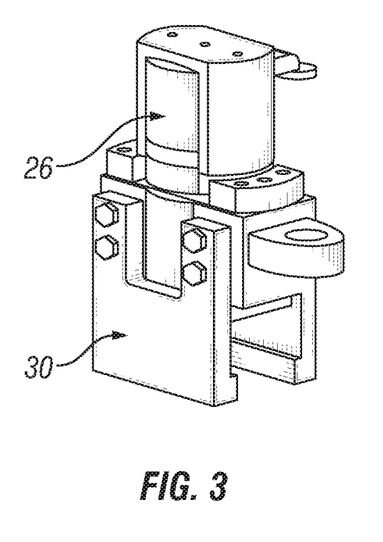
FIG. 3 is a perspective view of an anchor clamp for connecting a hydraulic cylinder to an arcuate rail.

FIGS. 2 and 3 illustrate an example mechanism for connecting the first end 24 of the hydraulic cylinder 36 to the arcuate rail 12 and indirectly to the support. The mechanism includes a brake 28 that is selectively extended toward the arcuate rail 12 by a lock hydraulic cylinder 26. When the brake 28 pushes on the arcuate rail 12, a clamp 30, coupled to the lock hydraulic cylinder 26, grabs on the arcuate rail 12.

Figure 4:
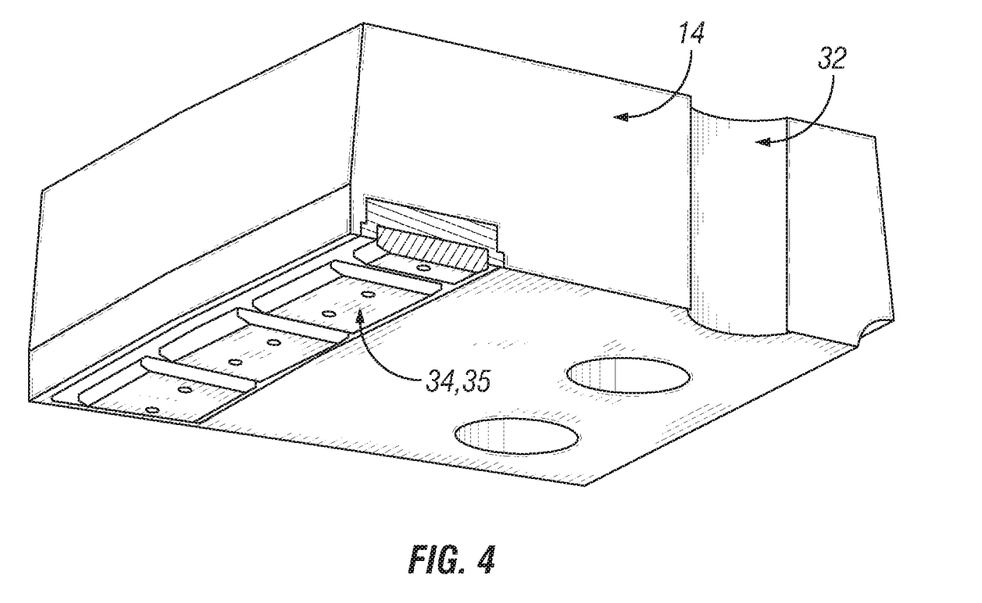
FIG. 4 is a perspective view of a lever plate including at least one low friction bearing pad mounted therein.

FIG. 4 illustrates a lever plate 14, having one or more holes 32 for extending the one or more bolts 16 therethrough. Mounted in the lever plate 14 are low friction bearing pads 34. The first bearing surface 13 of the repair axial bearing is formed on the arcuate rail 12, and the second bearing surface 35 of the repair axial bearing is formed on the low friction bearing pads 34. As shown, the low friction bearing pads 34 may be made of polytetrafluoroethylene. Spherical washers (not shown) may be provided between the one or more bolts 16 and the lever plate 14 so that the one or more bolts 16 do not see excessive stress during the pressing of the lever plate 14 and the lifting of the supported member.

Figure 5A:
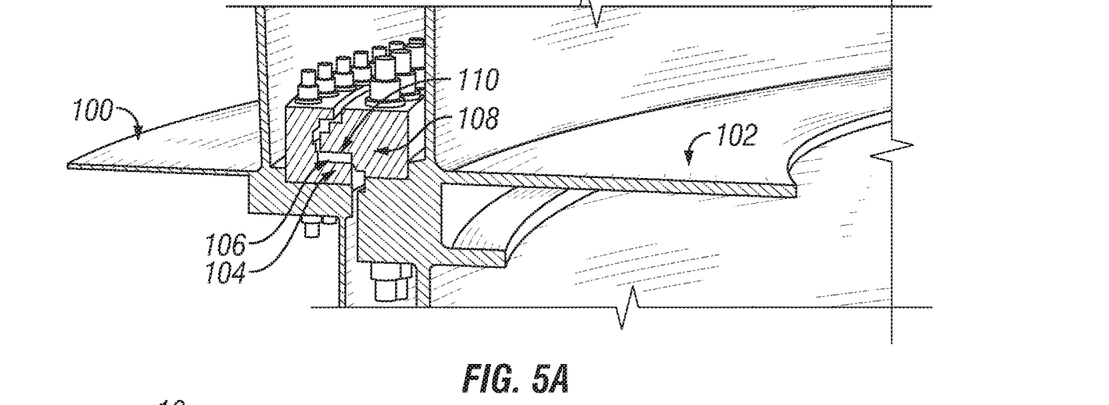
FIGS. 5A-5C illustrate a sequence of steps for supplanting a damaged axial bearing with a repair axial bearing.

FIG. 5A illustrates a damaged axial bearing (e.g., collapsed). The damaged axial bearing is placed under axial load between a support 100 and a supported member 102. The damaged axial bearing includes, in this example, an upper ring 108 and a lower ring 104, on which bearing surfaces 106 and 110 (also called races) are formed. Rollers (not shown) are provided between the bearing surfaces 106 and 110. The damage to the axial bearing may be caused, for example, by some of the rollers being crushed.

Figure 5B:
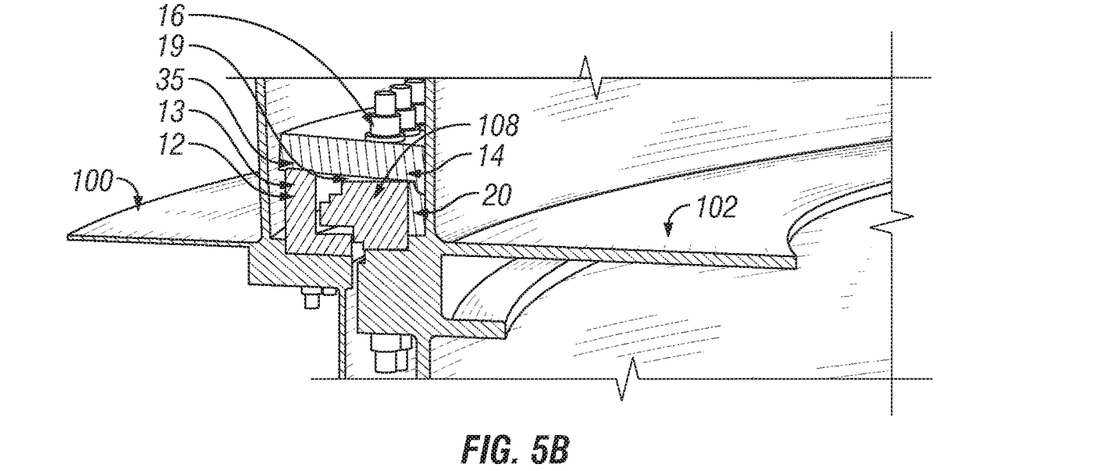

FIG. 5B illustrates the placement of the repair axial bearing components, including the arcuate rail 12, the lever plate 14, and one or more bolts 16, and the fulcrum 20, before the lever plate 14 is pressed on the raised portion 19 coupled to the supported member 102 (which is, in this example, is formed on the upper ring 108).

Several hydraulic jacks (e.g., bolt tensioners) may be positioned between the lever plate 14 and lift adapters threaded on the one or more bolts 16 to press the lever plate 14. The hydraulic jacks may be operated from a common manifold.

As the lever plate 14 is pressed the upper ring 108, the bearing surfaces 106 and 110 of the damaged axial bearing are axially unloaded, the first bearing surface 13 and the second bearing surface 35 of the repair axial bearing system are axially loaded. Then, inspection holes and/or cleaning holes may be drilled through portions of the lower ring 104 that have been bypassed and are no longer loaded.

Figure 5C:
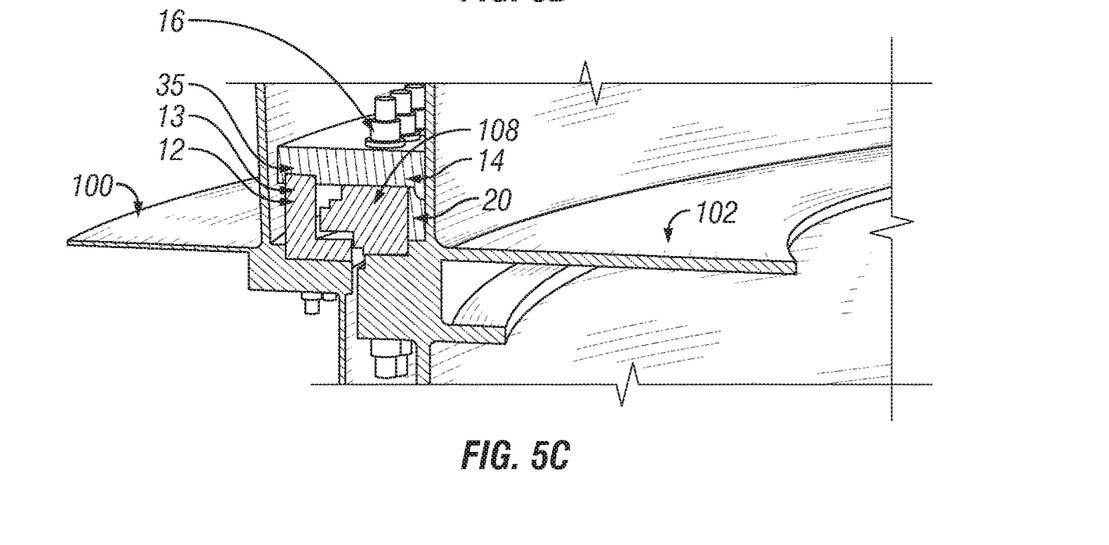

FIG. 5C illustrates the placement of the repair axial bearing components after the lever plate 14 is pressed against the upper ring 108, and nuts are tightened. In this position, all of the rollers may be offset from the upper ring 108.

During a repair operation, the axial load previously supported by a damaged bearing is taken off the damaged bearing. This axial load is supported by another means that may be sufficiently rigid to resist possible varying forces applied to the member supported by the damaged bearing and to prevent excessive oscillations of the supported member. Also, should this other means fails, it is advantageous to keep the damaged bearing in place to arrest the fall of the supported member through the damaged bearing. As the axial load is being fully controlled, the repair operation can be adjusted to deal with unexpected findings in the damaged bearing.

What is claimed is:

1. A repair axial bearing system for supplanting a damaged axial bearing placed under axial load between a support and a supported member, wherein the damaged axial bearing includes bearing surfaces, the repair axial bearing system comprising:
    an arcuate rail located adjacent to the bearing surfaces of the damaged axial bearing and on one of an inner side or an outer side of the bearing surfaces of the damaged axial bearing, the arcuate rail having a first bearing surface;
    one or more bolts, protruding upward from a raised portion that is coupled to the supported member, located adjacent to the bearing surfaces of the damaged axial bearing and on the other of the inner side or the outer side of the bearing surfaces of the damaged axial bearing;
    a lever plate, including at least one low friction bearing pad mounted therein, the at least one low friction bearing pad having a second bearing surface, the lever plate further including one or more holes corresponding to the one or more bolts, wherein the one or more bolts extend through the one or more holes, the second bearing surface being configured to slide over the first bearing surface upon the lever plate being pressed against the raised portion; and
    one or more nuts coupled to the one or more bolts on the lever plate for pressing the lever plate against the raised portion,
    wherein a height of the arcuate rail is sized such that the bearing surfaces of the damaged axial bearing are axially unloaded and the first bearing surface and the second bearing surface of the repair axial bearing system are axially loaded as the lever plate is pressed against the raised portion.

2. The repair axial bearing system of claim 1, further comprising a fulcrum coupled to the supported member on the same side of the bearing surfaces of the damaged axial bearing as the one or more bolts, the fulcrum being shaped for the lever plate continuously contacting the fulcrum along a pivot line as the lever plate is pressed against the raised portion.

3. The repair axial bearing system of claim 1, further comprising a hydraulic cylinder having a first end coupled to the support and a second end coupled to the supported member, wherein the second end is movable relative to the first end.

4. The repair axial bearing system of claim 3, wherein the first end is connected to the arcuate rail, and wherein the second end is connected to the lever plate.

5. The repair axial bearing system of claim 3, further comprising a controller programmed to actuate the hydraulic cylinder for rotating the supported member relative to the support.

6. The repair axial bearing system of claim 1, wherein the damaged axial bearing includes rollers, and wherein the height of the arcuate rail is sized such that the bearing surfaces of the damaged axial bearing are separated from all of the rollers as the lever plate is pressed against the raised portion of the supported member.

7. The repair axial bearing system of claim 1, wherein the lever plate comprises spherical washers.

8. The repair axial bearing system of claim 1, wherein the damaged axial bearing includes a lower ring coupled to the support, the lower ring having one of the bearing surfaces, wherein the damaged axial bearing further includes an upper ring coupled to the supported member, the upper ring having the other of the bearing surfaces, and the upper ring forming the raised portion.

9. The repair axial bearing system of claim 1, wherein the lever plate spans over an angular sector of less than sixty degrees.

10. The repair axial bearing system of claim 9, wherein the arcuate rail is formed of a plurality of contiguous rail sections, and wherein the lever plate is formed of a plurality plate sections.

11. The repair axial bearing system of claim 1, wherein the lever plate is shaped such that the lever plate is capable of pivoting while being pressed against the raised portion.

12. The repair axial bearing system of claim 1, wherein the second bearing surface of the at least one low friction bearing pad is capable of pivoting on the first bearing surface of the arcuate rail as the second bearing surface of the at least one low friction bearing pad and the first bearing surface of the arcuate rail are axially loaded.

13. The repair axial bearing system of claim 1, wherein tightening the one or more nuts causes the lever plate to pivot.

14. A method for supplanting a damaged axial bearing placed under axial load between a support and a supported member with a repair axial bearing, wherein the damaged axial bearing includes bearing surfaces, the method comprising:
    coupling an arcuate rail to the support at a location adjacent to the bearing surfaces of the damaged axial bearing and on one of an inner side and an outer side of the bearing surfaces of the damaged axial bearing, the arcuate rail having a first bearing surface;
    providing one or more bolts protruding upward from a raised portion coupled to the supported member at a location adjacent to the bearing surfaces of the damaged axial bearing and on the other of the inner side and the outer side of the bearing surfaces of the damaged axial bearing;
    providing a lever plate including at least one low friction bearing pad mounted therein, the at least one low friction bearing pad having a second bearing surface, the lever plate further including one or more holes corresponding to the one or more bolts, the second bearing surface being configured to slide over the first bearing surface upon the lever plate being pressed against the raised portion;
    passing the one or more bolts through the one or more holes;
    pressing the lever plate against the raised portion;
    coupling a nut to each of the one or more bolts on the lever plate;
    axially unloading the bearing surfaces of the damaged axial bearing as the lever plate is pressed against the raised portion of the supported member; and
    axially loading the first bearing surface and the second bearing surface of the repair axial bearing as the lever plate is pressed against the raised portion of the supported member.

15. The method of claim 14, further comprising:

coupling a fulcrum to the supported member on the same side of the bearing surfaces of the damaged axial bearing as the one or more bolts; and continuously contacting the lever plate and the fulcrum along a pivot line as the lever plate is pressed against the raised portion of the supported member.

16. The method of claim 14, wherein pressing the lever plate against the raised portion comprises:

tensioning the one or more bolts with at least one hydraulic jack;

releasing tension in the one or more bolts after coupling the nut to the one or more bolts on the lever plate; and lifting the supported member relative to the support.

17. The method of claim 16, wherein tensioning the one or more bolts with the at least one hydraulic jack comprises coupling a plurality of hydraulic jacks to a manifold to equalize tension in a plurality of bolts.

18. The method of claim 17, wherein the plurality of hydraulic jacks consist of bolt tensioners.

19. The method of claim 16, wherein the damaged axial bearing includes rollers, and wherein at least some of the rollers are crushed, and wherein the lifting of the supported member relative to the support is sufficient to prevent friction of the crushed rollers against the bearing surfaces of the damaged axial bearing.

20. A method for using a repair axial bearing system having a first bearing surface and a second bearing surface to provide rotation between a support and a supported member, the method comprising:

providing the repair axial bearing system, the repair axial bearing system including an arcuate rail coupled to the support, the first bearing surface being formed on the arcuate rail, the repair axial bearing system further including one or more bolts protruding upward from a raised portion coupled to the supported member, the repair axial bearing system further including a lever plate, the lever plate including at least one low friction bearing pad mounted therein, the second bearing surface being formed on the at least one low friction bearing pad, the lever plate further including one or more holes corresponding to the one or more bolts, the one or more bolts extending through the one or more holes, the lever plate being pressed against the raised portion using one or more nuts coupled to the one or more bolts on the lever plate, and the repair axial bearing system further including a hydraulic cylinder;

coupling a first end of the hydraulic cylinder to the support;

coupling a second end of the hydraulic cylinder to the supported member; and actuating the hydraulic cylinder to slide the second bearing surface over the first bearing surface.

21. The method of claim 20, wherein the support is coupled to an FPSO, and wherein the supported member is coupled to a turret.

22. The method of claim 21, further comprising synchronizing a movement of the second end relative to the first end to a positioning of the FPSO to maintain the turret geostationary.

23. A repair axial bearing system for supplanting a damaged axial bearing placed under axial load between a support and a supported member, wherein the damaged axial bearing includes bearing surfaces, the repair axial bearing system consisting essentially of:

an arcuate rail located adjacent to the bearing surfaces of the damaged axial bearing and on one of an inner side or an outer side of the bearing surfaces of the damaged axial bearing, the arcuate rail having a first bearing surface;

one or more bolts, protruding upward from a raised portion that is coupled to the supported member, located adjacent to the bearing surfaces of the damaged axial bearing and on the other of the inner side or the outer side of the bearing surfaces of the damaged axial bearing;

a lever plate, including at least one low friction bearing pad mounted therein, the at least one low friction bearing pad having a second bearing surface, the lever plate further including one or more holes corresponding to the one or more bolts, wherein the one or more bolts extend through the one or more holes, the second bearing surface being configured to slide over the first bearing surface upon the lever plate being pressed against the raised portion; and one or more nuts coupled to the one or more bolts on the lever plate for pressing the lever plate against the raised portion, wherein a height of the arcuate rail is sized such that the bearing surfaces of the damaged axial bearing are axially unloaded and the first bearing surface and the second bearing surface of the repair axial bearing system are axially loaded as the lever plate is pressed against the raised portion, and wherein tightening the one or more nuts causes the lever plate to pivot.

24. A repair axial bearing system for supplanting a damaged axial bearing placed under axial load between a support and a supported member, wherein the damaged axial bearing includes bearing surfaces, the repair axial bearing system consisting essentially of:

an arcuate rail located adjacent to the bearing surfaces of the damaged axial bearing and on one of an inner side or an outer side of the bearing surfaces of the damaged axial bearing, the arcuate rail having a first bearing surface;

one or more bolts, protruding upward from a raised portion that is coupled to the supported member, located adjacent to the bearing surfaces of the damaged axial bearing and on the other of the inner side or the outer side of the bearing surfaces of the damaged axial bearing;

a lever plate, including at least one low friction bearing pad mounted therein, the at least one low friction bearing pad having a second bearing surface, the lever plate further including one or more holes corresponding to the one or more bolts, wherein the one or more bolts extend through the one or more holes, the second bearing surface being configured to slide over the first bearing surface upon the lever plate being pressed against the raised portion;

one or more nuts coupled to the one or more bolts on the lever plate for pressing the lever plate against the raised portion; and a fulcrum coupled to the supported member on the same side of the bearing surfaces of the damaged axial bearing as the one or more bolts, the fulcrum being shaped for the lever plate continuously contacting the fulcrum along a pivot line as the lever plate is pressed against the raised portion, wherein a height of the arcuate rail is sized such that the bearing surfaces of the damaged axial bearing are axially unloaded and the first bearing surface and the second bearing surface of the repair axial bearing system are axially loaded as the lever plate is pressed against the raised portion, and wherein tightening the one or more nuts causes the lever plate to pivot.

25. A repair axial bearing system for supplanting a damaged axial bearing placed under axial load between a support and a supported member, wherein the damaged axial bearing includes bearing surfaces, the repair axial bearing system comprising:

an arcuate rail located adjacent to the bearing surfaces of the damaged axial bearing and on one of an inner side or an outer side of the bearing surfaces of the damaged axial bearing, the arcuate rail having a first bearing surface;

one or more bolts, protruding upward from a raised portion that is coupled to the supported member, located adjacent to the bearing surfaces of the damaged axial bearing and on a side of the bearing surfaces of the damaged axial bearing;

pivoting means for axially unloading the bearing surfaces of the damaged axial bearing as a lever plate is pressed against the raised portion;

at least one low friction bearing pad mounted in the lever plate, the at least one low friction bearing pad having a second bearing surface, the second bearing surface being configured to slide over the first bearing surface upon the lever plate being pressed against the raised portion; and one or more nuts coupled to the one or more bolts on the lever plate for pressing the lever plate against the raised portion.

* * * * *

UNITED STATES PATENT AND TRADEMARK OFFICE
CERTIFICATE OF CORRECTION

Page 1 of 1

PATENT NO. : 10,767,704 B2
APPLICATION NO. : 15/889059
DATED : September 8, 2020
INVENTOR(S) : James V. Maher et al.

It is certified that error appears in the above-identified patent and that said Letters Patent is hereby corrected as shown below:

On the Title Page

On the second page, item (56) References Cited, the FOREIGN PATENT DOCUMENTS should read as follows:
KR      101370663      B1      03/2014
WO      2011036406      A1      03/2011
WO      2017179986      A1      10/2017

Signed and Sealed this
Twenty-seventh Day of October, 2020

Andrei Iancu
*Director of the United States Patent and Trademark Office*